Dec. 14, 1954  J. P. SHERIDAN  2,696,681
NAVIGATION TRAINER FOR RADIO HOMING
Filed Nov. 11, 1942
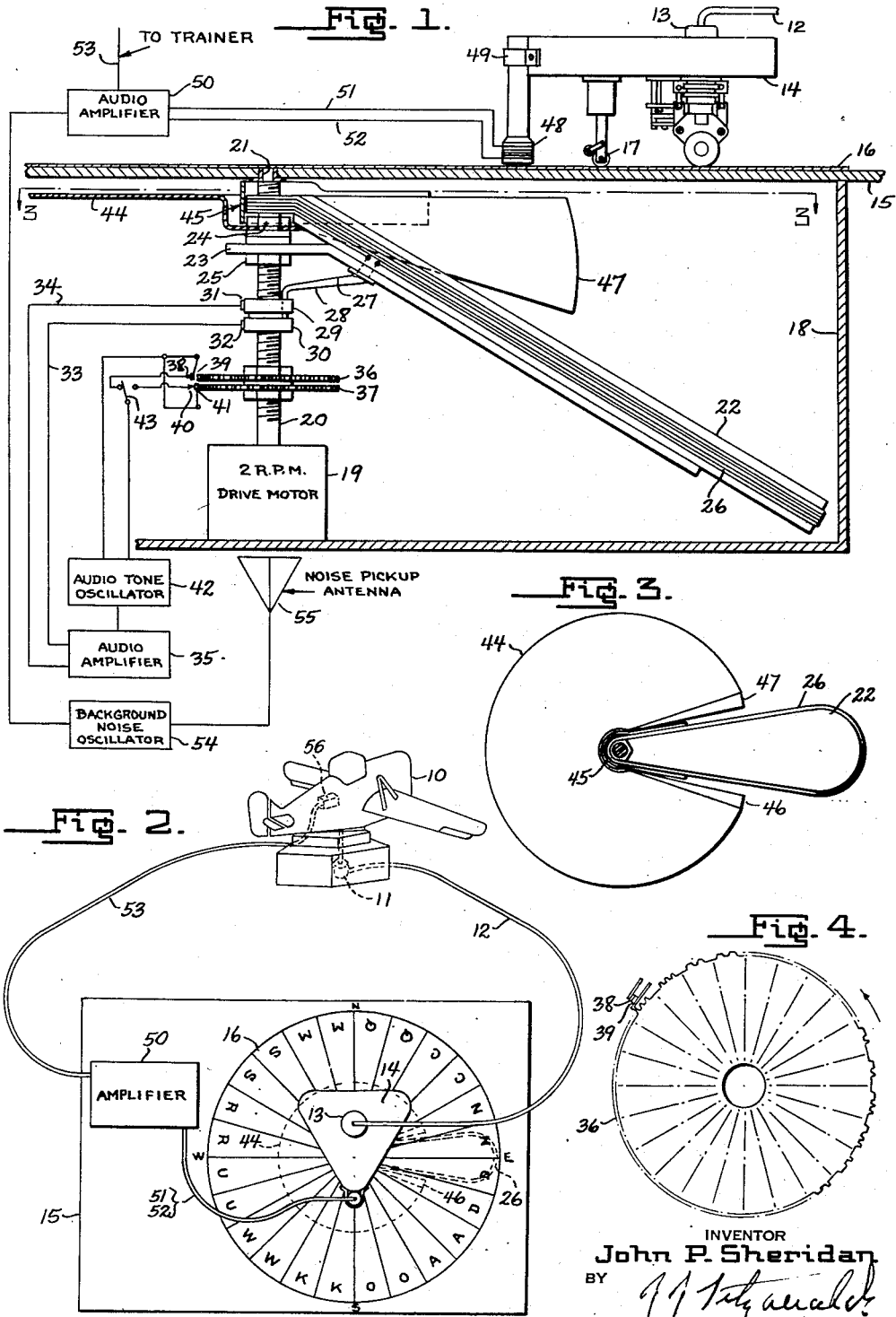
INVENTOR
John P. Sheridan
BY
ATTORNEY `United States Patent Office`

2,696,681
Patented Dec. 14, 1954

2,696,681

NAVIGATION TRAINER FOR RADIO HOMING

John P. Sheridan, United States Navy

Application November 11, 1942, Serial No. 465,211

14 Claims. (Cl. 35—10.2)

(Granted under Title 35, U. S. Code (1952), sec. 266)

My invention relates in general to aircraft training devices and in particular to a device for use in conjunction with a grounded trainer whereby ground instruction and training in problems involving the navigation of aircraft from a remote position in space to the source of a rotating "homing" radio beam which may be on an aircraft carrier or elsewhere can be accomplished in a simple and economical manner.

By use of a training device of this kind, a student pilot may be taught to fly a rotating radio beam and may acquire a high degree of efficiency therein before going to either the expense or hazard of actual flight.

In one type of rotating radio beam, a characteristic signal is broadcast at each 15° interval. These signals, such as different letters of the alphabet may be arranged or "coded" in any particular desired pattern and will usually be arranged in pairs. The rotating beam has directional characteristics and the pilot, depending, of course, on the distance between him and the source of the beam, is therefore able to hear only a limited number of the signals in the complete circular pattern. Thus, for example, if the pilot is able to hear only four of the signals as the beam sweeps its circular path and the signals are 15° apart in space, the pilot by determining the one of greatest intensity to his ear, will be able to determine the particular 15° sector in which he is then located. Since the pilot has a chart which duplicates the signal pattern broadcast by the beam, he can readily determine therefrom the bearing of the signal having the greatest intensity and then set his aircraft on the proper course to lead him to the source of the beam. When he comes over the source of the beam, all signals will be of equal intensity.

The object in general, of this invention, is to provide a signal device simulating accurately a multi-signal rotating radio beam by which a student pilot, when placed at some arbitrarily selected point in "space" in a ground trainer, is given training in "navigating" the trainer to the source of the beam.

A more specific object of the invention is to provide a signalling device consisting of a rotating "beam," simulating an actual rotating radio beam and keyed in simulation of a multi-signal pattern radiated by such radio beam, which is disposed beneath a table surface upon which a carriage is propelled and directionally controlled in accordance with the direction of a grounded trainer. A signal pickup disposed upon the carriage and sensitive to the signal-keyed beam as the latter rotates, repeats such signals to a receiver located in the trainer whereby a student pilot in the trainer, by proper interpretation of such signals, the respective intensities of which vary inversely as the distance between the center of rotation of the "beam" and the pickup on the carriage, is able to "navigate" the trainer from some arbitrarily selected assumed point in "space" to the source of the "beam."

These and other objects of my invention will become apparent from the detailed description to follow, and from the accompanying drawings in which like parts in the various views are indicated by like reference characters.

In the drawings which represent a preferred embodiment of the invention:

Fig. 1 is a combined schematic and vertical sectional view of the training device;

Fig. 2 is a top plan view of the device and includes a perspective view of a suitable grounded trainer associated therewith;

Fig. 3 is a view taken on lines 3—3 of Fig. 1 disclosing the rotating "beam" and shield therefor: and Fig. 4 is a plan view of one of the code wheels utilized for keying the rotating "beam" with a multi-signal pattern.

Referring now to the drawings, a grounded aviation trainer device 10 which may be of the type as described and illustrated in U. S. Patent No. 1,825,462, and which contains an enclosed cockpit for the student pilot receiving instruction, is mounted for rotation on a fixed axis. The construction and operation of this trainer are well known and therefore will not be shown or described in detail. Suffice to say here however, that the trainer contains many flight instruments including a conventional compass and a Selsyn transmitter unit 11 which is electrically connected by means of conductors in cable 12 to a corresponding Selsyn receiver 13 disposed on a carriage 14 which may be propelled in a manner similar to the type shown and described in U. S. Patent No. 2,179,663. As the trainer 10 is rotated on its axis by the student pilot, transmitter unit 11 also rotates therewith and causes a corresponding rotation of the receiver 13 which turns the carriage 14 through the same angle as the trainer is rotated. Thus the "heading" of the carriage 14 corresponds at all times with the "heading" of the trainer and is propelled over the surface of a table support 15 at the assumed forward speed of the trainer.

It should be understood, however, that insofar as this invention is concerned, the particular type of trainer and carriage above described are only exemplary. Other types of trainers and directionally-controlled carriages may be used and it is applicant's intention that the word "trainer" as used in the appended claims shall include any desired construction of non-flying or so-called "grounded" type which includes direction indicator means, such as a compass, and means operable by a student pilot for effecting relative movement between the trainer and the indicator means to thereby indicate to the student pilot a change in course of the "flight" assumed in the trainer.

Disposed upon the table 15, if desired, is a chart 16 which duplicates the multi-signal pattern sent out by the device. As seen from Fig. 2, this particular pattern, which is illustrative only, contains twenty-four segments of 15° each and the Morse signal for the letters shown are sent out in succession by a rotating electric field in the form of a "beam," as will be hereinafter described. The carriage 14 moves over this chart in accordance with the will of the student in operating the trainer and may, if desired, by means of an inking wheel 17, record the "flight" path taken by the trainer, but this recording means is not essential to the operation of the present invention.

A housing 18 is secured by any suitable means to the under side of table 15. Within this housing is positioned a motor 19 which is provided to rotate a shaft 20 extending vertically therefrom at a speed corresponding to the speed of an actual rotating radio beam. This speed may be 2 R. P. M. Shaft 20 is threaded in part and the upper end thereof may be journaled in a bearing sleeve 21 in table 15. The center of chart 16 may be coincident with the center of shaft 20.

A paddle-shaped member 22 which may be of wood, is secured at an angle to the surface of table 15 to shaft 20 by means of a bracket 23, the latter being fastened between a pair of retaining nuts 24 and 25.

A coil of wire 26 wound over member 22 and extending around the shaft 20 is connected by means of conductors 27, 28, slip rings 29, 30, contacts 31, 32, and conductors 33, 34, to the output of an audio amplifier 35.

One or more code discs 36, 37, are mounted upon the shaft 20 for rotation therewith. Code discs 36, 37, are adapted to intermittently close electric switch contact members 38, 39, and 40, 41, respectively, for keying an audio tone oscillator 42 of any well-known type, and therefore are not described in detail but simply illustrated in "block" form. A switch 43 may be utilized for placing either code wheel 36 or 37 in operation, to key the audio oscillator 42 in accordance with the "coding" on each wheel as shown by Fig. 4.

This "coding" consists of a series of notches cut into the periphery of the code wheels 36 and 37. The spacing between adjacent notches varies so that the peripherial distances between any one group of them corresponds to the Morse "dot" and "dash" signal combination representing a letter of the alphabet. Thus as clearly shown in Fig. 4, three short distances on the periphery of the code wheel, each of equal length, "codes" or keys the oscillator 42 with three "dots" representing the letter "S," while two longer such distances, also of equal length, codes the oscillator 42 with two "dashes" representing the letter "M." The remainder of the peripheries of the code wheels 36 and 37 are similarly notched to correspond to the Morse signals representing other letters of the alphabet included in the circular signal pattern.

The keyed current output from oscillator 42 is fed into the amplifier 35 and thence into the coil 26 by the circuit previously described, producing therein a similarly keyed pulsating field.

In order to give "beam" characteristics to this pulsating field, a circular shield member 44 having a cutout portion aligned with the coil 26 is provided and an additional U-shaped shield member 45 surrounds the portion of coil 26 adjacent the shaft 20. Downwardly extending shielding flaps 46 and 47 are provided on the shield member 44 at the cutout portion.

A coil of wire 48 is supported on the carriage 14 by a bracket 49 and is adapted to be inductively coupled with the pulsating field produced in the rotating coil 26. Through such coupling, a similarly pulsating current flow is induced in coil 48 which is fed into an amplifier 50 through conductors 51 and 52. The output from amplifier 50 is transmitted by electrical conductors in cable 53 to an aural receiver 56 located in the trainer 10 whereby the student pilot is able to hear a portion of the keyed signal output from the oscillator 42 which is fed into the rotating coil 26.

Background noise and ignition interference (which is experienced under actual flight conditions when operating on a rotating radio beam) may be simulated by the use of an oscillator 54, also conventional and therefore shown in "block" form. This latter oscillator is modulated by a "noise" pickup antenna 55 which is placed close to the motor 19 to pick up the noise therefrom, and the output from oscillator 54 is also fed into amplifier 50 and thence to the receiver 56 located in the trainer 10 via cable 53.

*Operation*

The student pilot is placed in the trainer 10 and is given a chart which is a duplicate of the multi-signal pattern as determined by the coding of the particular code wheel used. An instructor places the carriage 14 at any arbitrarily selected position on the table 15 which thus fixes the trainer at the same position in "space." Motor 19 is then started which rotates the coil 26, shields 44, 45, and code wheels 36, 37, one of which has been previously selected by operating the switch 43. The propulsion mechanism on carriage 14 is also started and the carriage 14 begins to move over the table 15 and chart 16 at a speed simulating an assumed forward speed of the trainer. The speed of the carriage may be about 1" per minute.

As previously explained, the coded keyed signal current output from oscillator 42 is fed into coil 26 and sets up therein a similarly keyed pulsating field which is given "beam" characteristics by the shield members 44 and 45. As this "beam" sweep its circular path and begins to approach the coil 48 on carriage 14, coil 48 becomes inductively coupled to the pulsating field produced by coil 26 and there is induced in coil 48 a similarly pulsating current which is then amplified by amplifier 50 and transmitted to the receiver 56 in the trainer.

Because of the fact that the coil 26 is inclined to the table 15, the inductive coupling between coils 26 and 48 will vary inversely as the distance between the coil 48 and the center of shaft 20 at which position the coil 26 is, of course, closest to the underside of table 15. The intensity of the strongest signal heard by the student pilot will likewise vary and this very accurately simulates an actual flight in the trainer relative to a rotating radio beam. By singling out the strongest signal heard, the student refers to his chart, locates this signal thereon and its bearing, and then sets his trainer on a "course" which will take him to the source of the simulated rotating radio beam. As previously explained, the carriage 14 follows the "course" taken by the trainer and as the carriage 14 moves closer to the center of the shaft 20, the signals heard by the student pilot will increase in intensity. By decreasing the volume of the receiver as the signal intensity increases, the student pilot is able to constantly clearly identify the strongest signal heard and thus keep the trainer on the proper "course." When the coil 48 reaches a position directly over the center of shaft 20, all signals of the circular multi-signal pattern will be heard by the student pilot in the trainer with equal intensity and the student will then know that the aircraft simulated by the trainer is directly over the simulated rotating radio beam.

If the inking wheel 17 on carriage 14 is used, the "flight" of the trainer will be recorded on the chart 16 which may be useful for observing errors and deviations from the proper course from the original starting position to the source of the simulated rotating radio beam.

In conclusion, I wish to point out that the above-described apparatus is subject to changes in construction and arrangement of parts without departing from the spirit and scope of my invention and that therefore the appended claims should be so construed. For example, while I prefer to use a keyed pulsating rotating electric field as the "beam" simulating the actual radio beam, other types of rotating beams such as a light beam suitably keyed, with a complementary light sensitive pickup carried by the carriage 14 might be adapted for this purpose.

The invention described herein may be manufactured and used by or for the Government of the United States of America for governmental purposes without the payment of any royalties thereon or therefor.

Having thus set forth and disclosed the nature of this invention, what is claimed is:

1. In combination, a grounded trainer simulating an aircraft, said trainer including direction indicator means and means operable by a student for effecting relative movement between said trainer and direction indicator means to indicate a change in course of said trainer, a table support member remote from the trainer, means disposed adjacent the surface of said table support member and including a rotating radiant energy radiator for producing signals in simulation of the directional signals included in a circular signal pattern radiated by a rotating radio beam, a carriage, means for propelling said carriage over said table support member at a speed corresponding to the assumed forward speed of said trainer, means coupled between said trainer and carriage operable to turn said carriage directionally in accordance with relative directional changes between said trainer and indicator means, signal responsive means disposed on said carriage and responsive to the signals from said signal producing means, receiver means disposed in said trainer, and means connecting said signal responsive means to said receiver means whereby said student may receive said signals.

2. In combination, a grounded trainer simulating an aircraft, said trainer including direction indicator means and means operable by a student for effecting relative movement between said trainer and direction indicator means to indicate a change in course of said trainer, a table support member remote from the trainer, means including a rotating coil for producing a rotating beam adjacent said table support member in simulation of a rotating radio beam, means for keying said beam with code signals in simulation of the signals included in a signal pattern radiated by said rotating radio beam, a carriage, means for propelling said carriage over said table support member at a speed corresponding to the assumed forward speed of said trainer, means coupled between said trainer and carriage operable to turn said carriage directionally in accordance with relative directional changes between said trainer and indicator means, signal responsive means disposed on said carriage responsive to said code signals, receiver means disposed in said trainer, and means connecting said signal responsive means to said receiver means whereby said student may receive said signals.

3. In combination, a grounded trainer simulating an aircraft, said trainer including direction indicator means and means operable by a student for effecting relative movement between said trainer and direction indicator means to indicate a change in course of said trainer, a table support member remote from the trainer, means including a rotating coil for producing a rotating electric beam adjacent said table support member in simulation of a rotating radio beam, means for keying said electric beam with signals in simulation of the signals included in a signal pattern radiated by said rotating radio beam, a carriage, means for propelling said carriage over said table support member at a speed corresponding to the assumed forward speed of said trainer, means coupled between said trainer and carriage operable to turn said carriage directionally in accordance with relative directional changes between said trainer and indicator means, signal responsive means disposed on said carriage and responsive to the signals of said keyed electric beam, and means coupled to said signal responsive means for transmitting said signals to said trainer.

4. In combination, a ground trainer simulating an aircraft, said trainer including direction indicator means and means operable by a student for effecting relative movement between said trainer and direction indicator means to indicate a change in course of said trainer, a table support member remote from said trainer, means including a rotating shielded coil for producing a rotating electric beam adjacent said table support member in simulation of a rotating radio beam, keying means for controlling the energization of said coil to produce in said coil a pulsating field simulating the signals included in a signal pattern radiated by the radio beam, a carriage, means for propelling said carriage over said member at a speed corresponding to the assumed forward speed of said trainer, means coupled between said trainer and said carriage and operable to turn said carriage directionally in accordance with relative directional changes between said trainer and indicator means, signal responsive means disposed on said carriage and including a coil adapted to be inductively coupled to said rotating coil, receiver means disposed in said trainer, and means connecting said signal responsive means to said receiver means whereby said student may receive said signals.

5. In combination, a grounded trainer simulating an aircraft, said trainer including direction indicator means and means operable by a student for effecting relative movement between said trainer and direction indicator means to indicate a change in course of said trainer, a table support member remote from said trainer, shaft means disposed beneath said table support member, a shield member having a cutout portion therein, a first coil extending outwardly from said shaft, said coil lying within the opening in said shield member and extending downwardly at an acute angle to the surface of said table support member, said coil being nearest the surface of said table support member at said shaft, coding means rotatable with said shaft, means for rotating said shaft for obtaining rotation of said shield, coil and coding means, an oscillator, circuit means connecting said oscillator and coil, means for keying said oscillator by said rotating coding means for creating in said rotating coil a similarly keyed pulsating field in simulation of the signals in a multi-signal pattern radiated by a rotating radio beam, a carriage, means for propelling said carriage over said table support member at a speed corresponding to the assumed forward speed of said trainer, means coupled between said trainer and carriage operable to turn said carriage directionally in accordance with relative directional changes between said trainer and indicator means, a second coil disposed on said carriage and adapted to be inductively coupled with the keyed pulsating field of said first coil through the cutout portion in said shield member for inducing in said second coil a similarly keyed pulsating current, aural receiver means disposed in said trainer, and circuit means for feeding the pulsating current in said second coil to said receiver means whereby said student may receive the signals produced in simulation of signals produced by said rotating radio beam.

6. In an aeronautical ground training device having a ground trainer, a support member and a carriage movable over said member, the heading of said carriage corresponding to the heading of said trainer, the combination comprising shaft means disposed beneath said member, shield member mounted on said shaft and having a cutout portion therein, a first coil extending outwardly from said shaft and lying within the opening in said shield member, said coil extending downwardly at an acute angle to the surface of said support member and being nearest the surface of said support member at said shaft means, coding means mounted for rotation with said shaft means, means for rotating said shaft means thereby to rotate said shield member, coil and coding means, oscillator means coupled to said coil, means for keying said oscillator means by said coding means to create in said coil a pulsating field in simulation of the signals in a signal pattern radiated by a rotating radio beam, a second coil on said carriage and positioned to be inductively coupled to said first coil whereby a pulsating signal is induced in said second coil, and means for transmitting said pulsating signal to said trainer.

7. In an aeronautical ground training device having a ground trainer, a support member and a carriage movable over said member, the heading of said carriage corresponding to the heading of said trainer, the combination comprising a shielded first coil rotatably mounted beneath said support member and extending downwardly at an acute angle to the surface thereof, said coil being nearest the surface of said support member at the axis of rotation of said coil, rotatable coding means, means for simultaneously rotating said coil and said coding means, oscillator means coupled to said coil, means responsive to said coding means for keying said oscillator means to create in said coil a pulsating field simulating the signals in a signal pattern radiated by a rotating radio beam, a second coil on said carriage and positioned to be inductively coupled to said first coil whereby a pulsating signal is induced in said second coil, and means for transmitting said pulsating signal to said trainer.

8. In an aeronautical ground training device having a ground trainer, a support member and a carriage movable over said member, the heading of said carriage corresponding to the heading of said trainer, the combination comprising a shielded first coil rotatably mounted beneath and extending at an acute angle away from the surface of said member, rotatable coding means, means for simultaneously rotating said coil and said coding means, energizing means coupled to said coil and responsive to said coding means for producing in said coil a pulsating field simulating the signals in a signal pattern radiated by a rotating radio beam, a second coil on said carriage and positioned to be inductively coupled to said first coil whereby a pulsating signal is induced in said second coil, and means for transmitting said pulsating signal to said trainer.

9. In an aeronautical ground training device having a ground trainer to be occupied by a student and a reference surface a point on which represents an assumed radio transmitting station, the combination comprising a shielded first coil mounted beneath said surface for rotation about said point, said coil extending downwardly at an acute angle to said surface and being nearest said surface at said point, rotatable coding means, means for simultaneously rotating said coding means and said coil, energizing means coupled to said coil and responsive to said coding means for producing in said coil a pulsating field simulating the signals in a signal pattern radiated by said station, a second coil movable over said surface and positioned to be inductively coupled to said first coil whereby a pulsating signal is induced in said second coil, means for controlling the position of said second coil relative to said point in accordance with the suppositional position of the aircraft relative to the simulated transmitting station, and means for transmitting said pulsating signal to said trainer.

10. In an aeronautical ground training device having a ground trainer, a support member and a carriage movable over said member, the heading of said carriage corresponding to the heading of said trainer, the combination comprising a radiant energy radiator mounted beneath said member for rotation about an axis perpendicular to said member, rotatable coding means, means for simultaneously rotating said radiator and said coding means, energizing means coupled to said radiator and responsive to said coding means for producing in said radiator a pulsating radiation simulating the signals in a signal pattern radiated by a rotating radio beam, a radiant energy receiver on said carriage and positioned to receive energy from said radiator whereby a pulsating signal is produced in said receiver, and means coupled to said receiver for transmitting said pulsating signal to said trainer.

11. In an aeronautical ground training device having a ground trainer, a support member and a carriage movable over said member, the heading of said carriage corresponding to the heading of said trainer, the combination comprising a radiant energy radiator mounted beneath said member, means for rotating said radiator about an axis perpendicular to said member, energizing means coupled to said radiator for producing in said radiator a pulsating radiation simulating the signals in a signal pattern radiated by a rotating radio beam, a radiant energy receiver on said carriage and positioned to receive energy from said radiator whereby a pulsating signal is produced in said receiver, and means coupled to said receiver for transmitting said pulsating signal to said trainer.

12. In an aeronautical ground training device having a ground trainer to be occupied by a student and a reference surface a point on which represents an assumed radio station, the combination comprising a radiant energy radiator mounted beneath said surface for rotation about said point, rotatable coding means, means for simultaneously rotating said coding means and said radiator, energizing means coupled to said radiator and responsive to said coding means for producing in said radiator a pulsating radiation simulating the signals in a signal pattern radiated by said station, a radiant energy receiver movable over said surface and positioned to receive energy from said radiator whereby a pulsating signal is produced in said receiver, means for controlling the position of said receiver relative to said point in accordance with the suppositional position of the aircraft relative to the simulated transmitting station, and means coupled to said receiver for transmitting said pulsating signal to the student.

13. In an aeronautical ground training device having a ground trainer to be occupied by a student and a reference surface a point on which represents an assumed radio station, the combination comprising a radiant energy radiator mounted for rotation about said point, rotatable coding means, means for simultaneously rotating said radiator and said coding means, energizing means coupled to said radiator and responsive to said coding means for producing in said radiator a pulsating radiation simulating the signals in a signal pattern radiated by said station, a radiant energy receiver movable along said surface and positioned to receive energy from said radiator whereby a pulsating signal is produced in said receiver, means for controlling the position of said receiver relative to said point in accordance with the suppositional position of the aircraft relative to the simulated transmitting station, and means coupled to said receiver for transmitting said pulsating signal to the student.

14. In an aeronautical ground training device having a ground trainer to be occupied by a student and a reference surface a point on which represents an assumed radio station, the combination comprising a radiant energy radiator mounted beneath said surface for rotation about said point, means for rotating said radiator, energizing means coupled to said radiator for producing in said radiator a pulsating radiation simulating the signals in a signal pattern radiated by said station, a radiant energy receiver movable over said surface and positioned to receive energy from said radiator whereby a pulsating signal is produced in said receiver, means for controlling the position of said receiver relative to said point in accordance with the suppositional position of the aircraft relative to the simulated transmitting station, and means coupled to said receiver for transmitting said pulsating signal to the student.

References Cited in the file of this patent

UNITED STATES PATENTS

| Number | Name | Date |
|---|---|---|
| 2,119,083 | Link | May 31, 1938 |
| 2,130,913 | Tolson | Sept. 20, 1938 |
| 2,179,663 | Link | Nov. 14, 1939 |
| 2,253,501 | Barrow | Aug. 26, 1941 |
| 2,312,962 | De Florez et al. | Mar. 2, 1943 |
| 2,326,764 | Crane | Aug. 17, 1943 |
| 2,346,693 | Lyman et al. | Apr. 18, 1944 |
| 2,452,038 | Crane | Oct. 26, 1948 |
| 2,454,503 | Crane | Nov. 23, 1948 |
| 2,457,130 | Crane | Dec. 28, 1948 |
| 2,485,331 | Stuhrman | Oct. 18, 1949 |

OTHER REFERENCES

Air Corps News Letter, vol. 21, No. 6, March 15, 1938, pages 7 and 8.